United States Patent
Hoeffken

(10) Patent No.: US 7,632,067 B2
(45) Date of Patent: Dec. 15, 2009

(54) BLOWER HOUSING AND METHOD OF MANUFACTURE

(76) Inventor: Russell W. Hoeffken, 3991 Green Park Rd., St. Louis, MO (US) 63125

( * ) Notice: Subject to any disclaimer, the term of this patent is extended or adjusted under 35 U.S.C. 154(b) by 723 days.

(21) Appl. No.: 11/266,078

(22) Filed: Nov. 2, 2005

(65) Prior Publication Data

US 2008/0193284 A1   Aug. 14, 2008

Related U.S. Application Data

(60) Provisional application No. 60/627,805, filed on Nov. 15, 2004.

(51) Int. Cl.
*F04D 29/62* (2006.01)

(52) U.S. Cl. .................... 415/204; 415/206; 415/214.1; 29/513; 29/521; 29/888.024

(58) Field of Classification Search ................ 415/203, 415/204, 206, 214.1, 215.1; 29/509, 513, 29/521, 888.024, 889.4
See application file for complete search history.

(56) References Cited

U.S. PATENT DOCUMENTS

| | | | | | |
|---|---|---|---|---|---|
| 3,653,116 | A | * | 4/1972 | Lov et al. | 415/204 |
| 3,743,439 | A | * | 7/1973 | Cann | 415/206 |
| 3,909,918 | A | * | 10/1975 | Takizawa et al. | 29/509 |
| 4,599,042 | A | * | 7/1986 | Colliver | 415/204 |
| 5,158,432 | A | * | 10/1992 | Cox | 415/214.1 |
| 5,221,183 | A | | 6/1993 | Hoeffken | |

* cited by examiner

*Primary Examiner*—Christopher Verdier
(74) *Attorney, Agent, or Firm*—Armstrong Teasdale LLP

(57) ABSTRACT

A blower housing and method of manufacture includes a wrapper wall sheet conjoined with a first side wall and a second side wall and held together with a seam interlocked with mating protrusions and apertures. The housing design may utilize different types and thicknesses of conjoined materials, allows reuse of the components when separated, and a substantially smooth positive locking seam without the use of welds or fasteners.

10 Claims, 12 Drawing Sheets

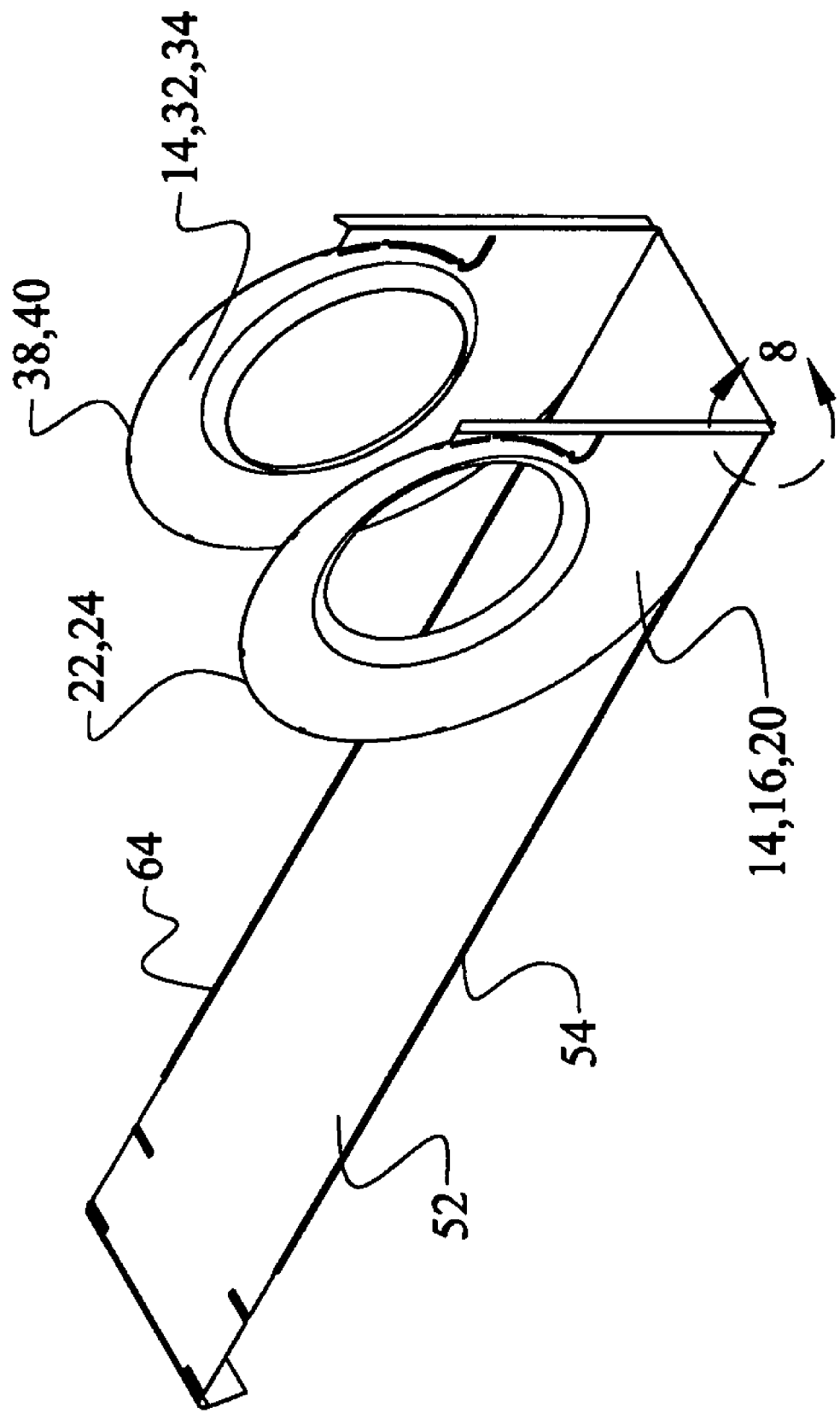

BLOWER HOUSING AND METHOD OF MANUFACTURE

This application claims priority of U.S. Provisional Patent Application No. 60/627,805, filed Nov. 15, 2004.

BACKGROUND OF THE INVENTION

The art of the present invention relates to blower housings for blower fan assemblies used in HVAC systems although the present invention can also be utilized in other industries employing blower systems. The improved blower housing of the present invention incorporates a uniquely formed joint or seam having a combination locking tab and slot which provides positive lockup of the blower housing side walls to a blower housing wrapper wall sheet. The present art essentially eliminates unintentional separation of the formed unit both prior to final manufacturing assembly and during its entire useful service life.

Blower housings of the type pertaining to the present invention are typically employed in forced air heating furnaces or air conditioners. In most cases, the blower is assembled in the interior of the HVAC equipment. Ambient air is blown by the blower over heat exchangers that heat or cool the air. The heated or cooled air is then forced from the furnace/air conditioner by the blower. A typical blower housing contains a cylindrical blower fan and is constructed from a pair of housing side walls spaced at opposite lateral sides of the blower housing and a wrapper wall sheet that is connected around peripheral edges of the two side walls. The wrapper wall sheet spaces the two side walls laterally from each other and gives the blower housing a general cylindrical configuration well suited for containing the cylindrical blower fan.

With the commercially manufactured prior art, the side walls and the wrapper wall sheet of a conventional non-welded blower housing assembly are typically either attached by a crimped folded over seam joint or, as in the case of applicant's prior U.S. Pat. No. 5,221,183, a two-sectional angled seam joint. Both of the prior art attachment types, use seams which are now known to function as an essential slip-joint allowing movement and/or separation of the assembly's side walls and wrapper wall sheet. This movement and/or separation problem is particularly apparent during final assembly of the complete blower unit. (i.e. motor and blower fan installation) When separated, the side walls and the wrapper wall sheet are no longer usable thereby causing significant operating and yield loss (e.g. scrap) during the manufacturing or repair process. Prior art blower housings attempt to address the blower housing separation problem by utilizing either spot welds and/or auxiliary fasteners, such as end screws, neither of which is satisfactory since both increase the manufacturing cost of the blower housing.

The combination locking tab and slot seam of Applicant's improved blower housing allows for the joining of different materials and/or different material thicknesses. The seam versatility of the present invention, which is adaptable to material variations, can provide significant engineering advantages such as thicker material utilization on the load bearing side wall (which typically supports the motor and wheel assembly) and thinner material utilization on the non-load bearing side wall and the wrapper wall sheet. Also, a greater size range of blower housings can be manufactured in the same assembly machines with less cycle time and without changeover or modification to the equipment, thereby reducing the manufacturing cost of the blower housings. The ability to join the blower housing dissimilar material or material of varying thickness is desired since the assembly machine can be built easier and less expensively. Accordingly, one assembly or forming machine can be programmed to not only make a larger size range of blower housings but also to produce the blower housings faster and therefore less expensively.

The combination locking tab and slot seam of the present invention further provides that the locking tab is substantially flush with the outside surface of the wrapper wall sheet when finally engaged in the slot regardless of orientation or material variation. This ensures a substantially smooth seam throughout its entire formed length.

Accordingly, it is an object of the present invention to provide an improved blower housing and method of manufacture which provides a positive lockup of blower side walls to a blower housing without the use of welds or fasteners.

Another object of the present invention is to provide an improved blower housing and method of manufacture which is environmentally friendly by allowing reuse of the blower side walls and wall sheet when separated without the necessity of discarding said components.

A further object of the present invention is to provide an improved blower housing and method of manufacture which is capable of joining different materials and materials of different thicknesses.

A still further object of the present invention is to provide an improved blower housing and method of manufacture which is easy and economical to manufacture in a variety of sizes with the same assembly machines.

A yet further object of the present invention is to provide an improved blower housing and method of manufacture having locking tabs mating with slots which are substantially flush with the outside surface of the wrapper wall sheet regardless of orientation or material variation in order to provide a substantially smooth seam.

SUMMARY OF THE INVENTION

The art of the present invention comprises a new and improved blower housing utilizing a unique joint or seam for attaching both side walls to a wrapper wall sheet. The improved blower housing comprises a first side wall, a second side wall opposite the first side wall, and a wrapper wall sheet attached intermediate the first side wall and the second side wall. The present art prohibits slippage in the seams or joints between the side walls and wrapper wall which is especially useful during manufacturing with worn or out of adjustment forming machines. It further allows use of spring loaded forming rollers within the forming machine whereby a wide range of materials (including thicknesses) may be utilized.

The wrapper wall sheet has a first lateral edge flange and a second lateral end flange opposite the first lateral edge flange. The lateral edge flanges comprise inner portions and outer portions having one or more apertures. The side walls have an inner surface, an outer surface, and a circumferential edge with an edge margin having one or more protrusions. The one or more protrusions protrude from the surface of the side walls. The one or more apertures of the wrapper wall sheet are capable of receiving the one or more protrusions of the side walls. This provides wrapper wall sheet lateral edge flange attachment to the edge margins of the circumferential edges of the side walls by a formed joint or seam.

The formed joint or seam comprises the combination of the one or more protrusions of the edge margin of the side walls received within the one or more apertures of the lateral edge flanges of the wrapper wall sheet. Thus, when the lateral edge flanges of the wrapper wall sheet are formed or pressed against the edge margins of the side walls, the one or more protrusions are substantially locked within the one or more apertures.

The improved blower housing is typically manufactured from sheet metal, preferably sheet metal which is either inherently corrosion resistant or coated to provide corrosion resistant properties. Typical sheet metals include but are not limited to stainless steel, aluminum, and coated steel products, such as pre-painted steel, galvanized steel, galvalume® steel, or other aluminized steels. The sheet metal would typically have a thickness range of 16-26 gauge, as conventionally measured within the sheet metal industry.

BRIEF DESCRIPTION OF THE DRAWINGS

Numerous other objects, features and advantages of the invention should now become apparent upon a reading of the following detailed description taken in conjunction with the accompanying drawings, in which:

FIG. 5 is a perspective unassembled view of the preferred embodiment.

FIG. 13a is another cross sectional view of the alternate embodiment of the locked seam after forming taken along line 13a of FIG. 12a.

DETAILED DESCRIPTION

Figure 1:
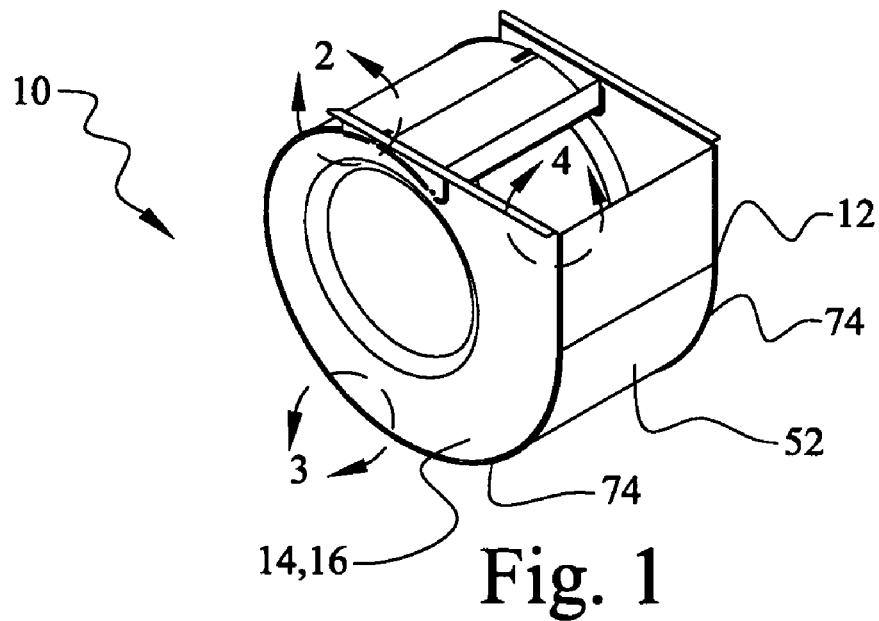
FIG. 1 is a perspective view of the preferred embodiment of the improved blower housing.
Figure 2:
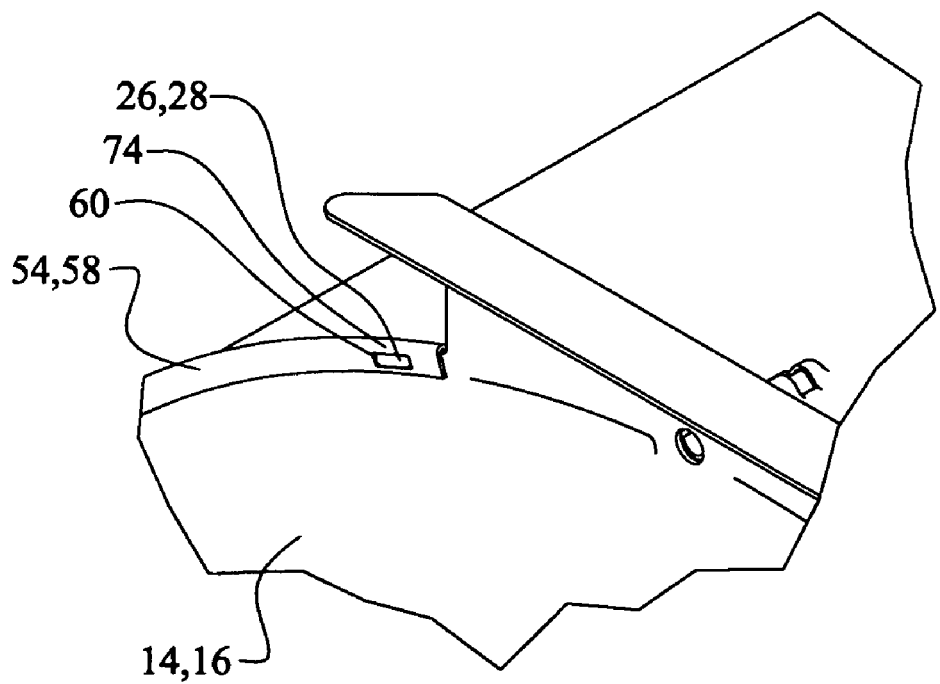
FIG. 2 is a detailed perspective view of the preferred embodiment taken along line 2 of FIG. 1.
Figure 3:
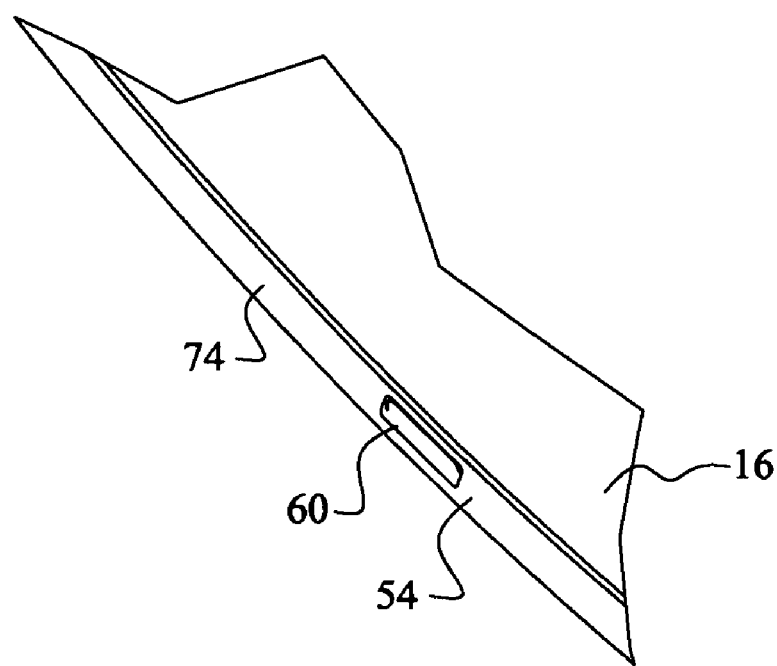
FIG. 3 is a detailed perspective view of the preferred embodiment taken along line 3 of FIG. 1.
Figure 4:
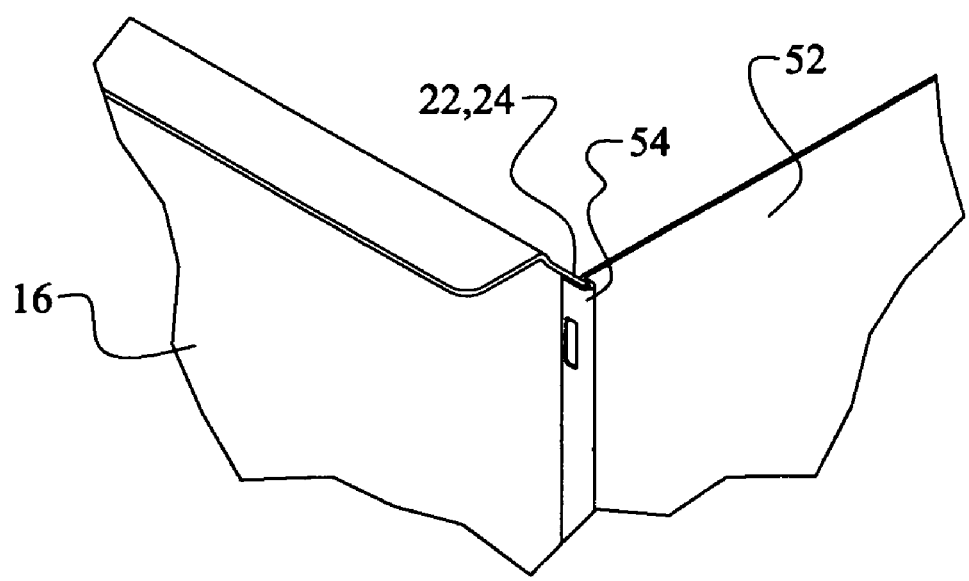
FIG. 4 is a detailed perspective view of the preferred embodiment taken along line 4 of FIG. 1.
Figure 5A:
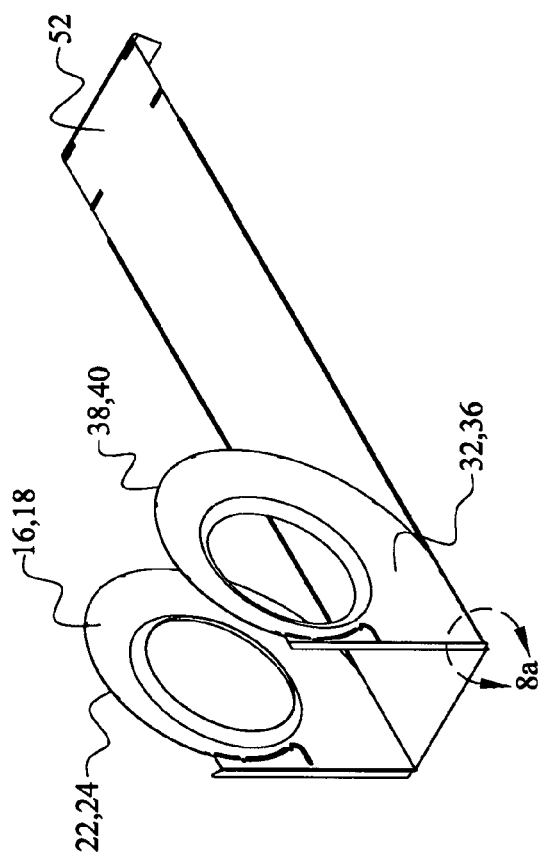
FIG. 5a is another perspective unassembled view of the preferred embodiment.
Figure 6:
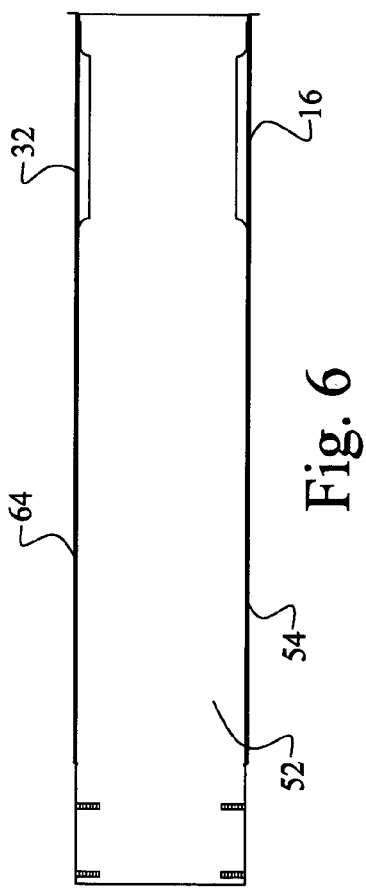
FIG. 6 is a top plan unassembled view of the preferred embodiment.
Figure 7:
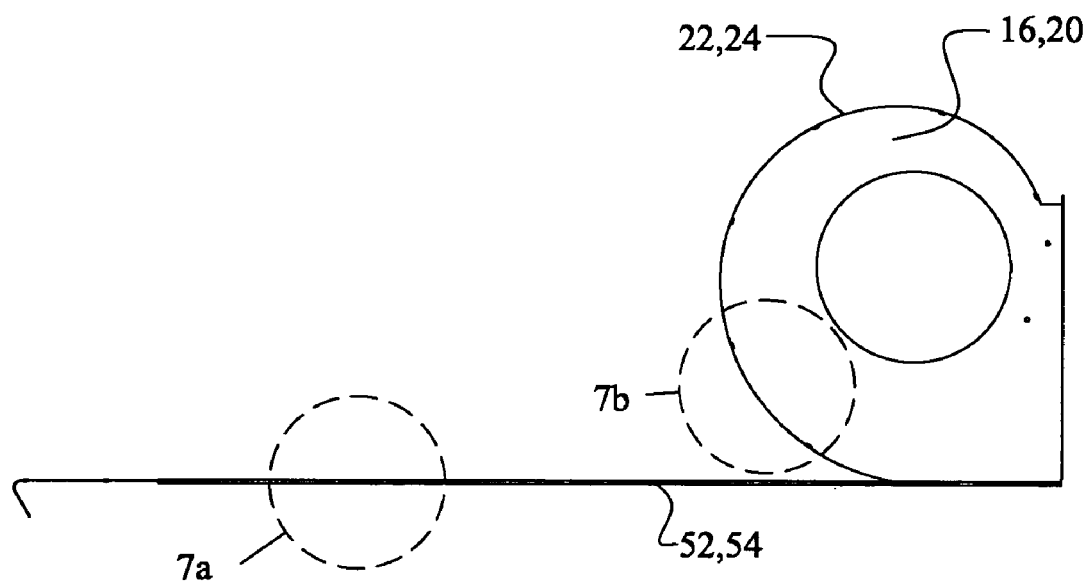
FIG. 7 is a left side unassembled view of the preferred embodiment.
Figure 7A:
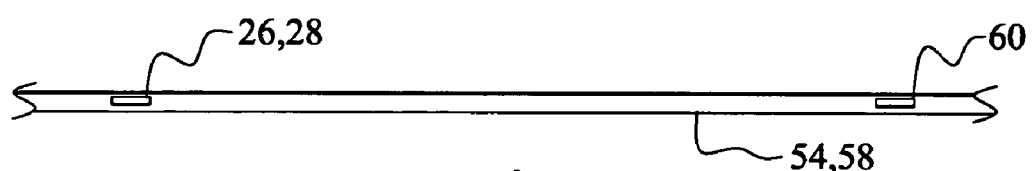
FIG. 7a is a detailed side view of the preferred embodiment taken along line 7a of FIG. 7 further illustrating the one or more first apertures of the wrapper wall sheet.
Figure 7B:
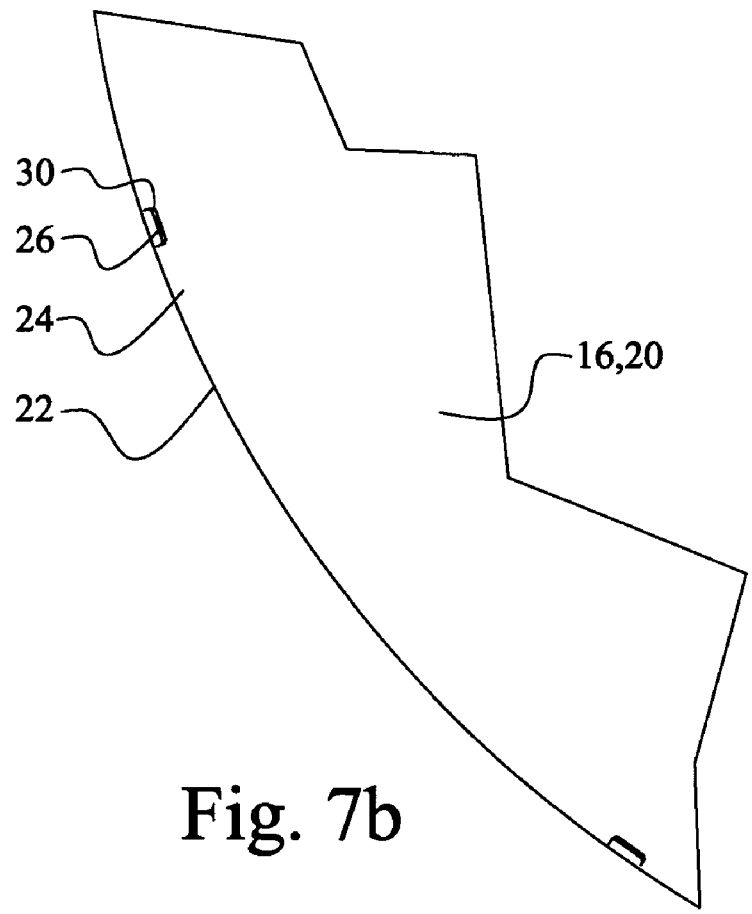
FIG. 7b is a detailed side view of the preferred embodiment taken along line 7b of FIG. 7 further illustrating the one or more first protrusions of the first side wall.
Figure 7C:
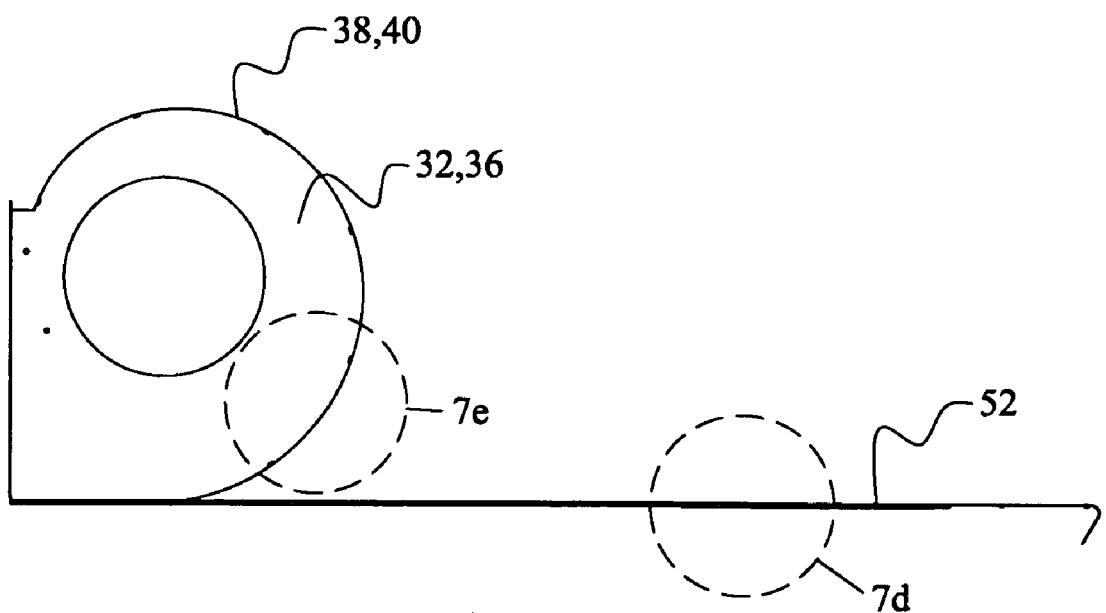
FIG. 7c is a right side unassembled view of the preferred embodiment.
Figure 7D:
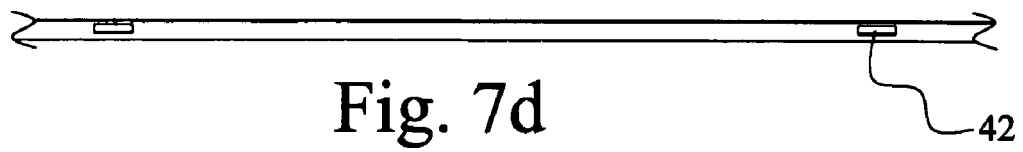
FIG. 7d is a detail right side view of the preferred embodiment taken along line 7d of FIG. 7c further illustrating the one or more second apertures of the wrapper wall sheet.
Figure 7E:
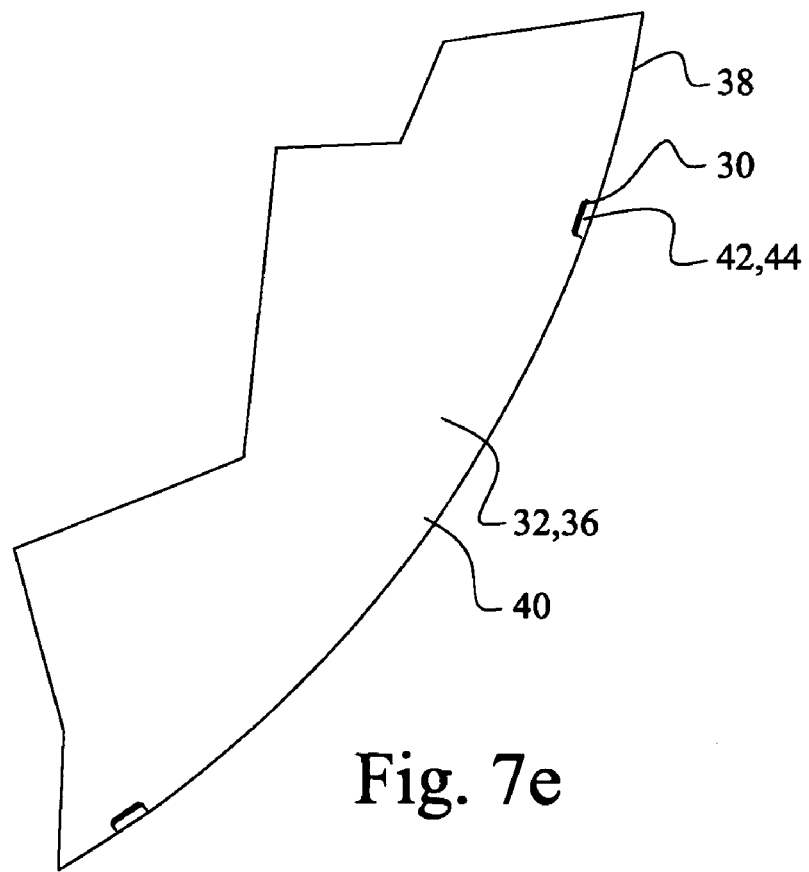
FIG. 7e is a detail right side view of the preferred embodiment taken along line 7e of FIG. 7c further illustrating the one or more second protrusions of the second side wall.
Figure 8:
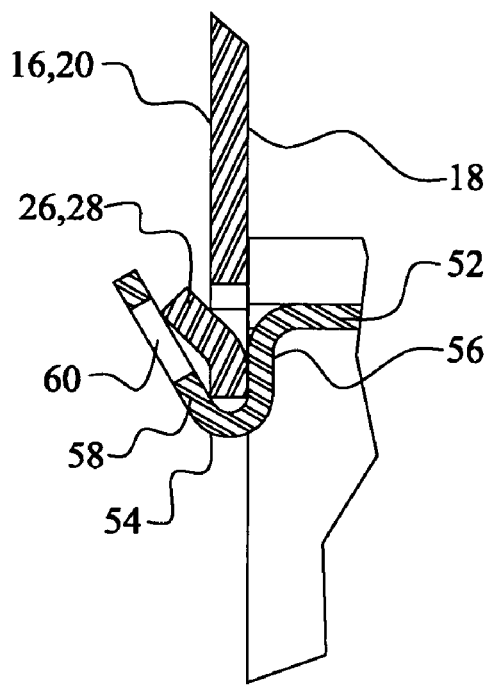
FIG. 8 is a cross sectional view of the preferred embodiment of the un-locked seam prior to forming taken along line 8 of FIG. 5 and further illustrating the one or more first apertures and the first lateral edge of the wrapper wall sheet, and the one or more first protrusions of the first side wall.
Figure 8A:
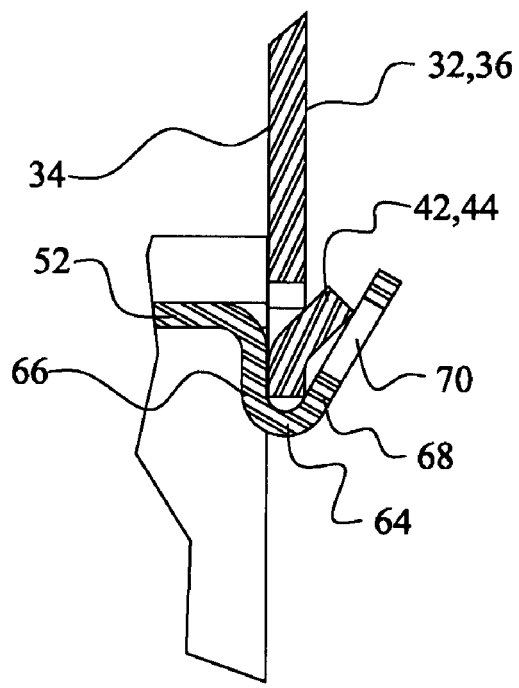
FIG. 8a is another cross sectional view of the preferred embodiment of the un-locked seam prior to forming taken along line 8a of FIG. 5a and further illustrating the one or more second apertures and the second lateral edge of the wrapper wall sheet, and the one or more second protrusions of the second side wall.
Figure 9:
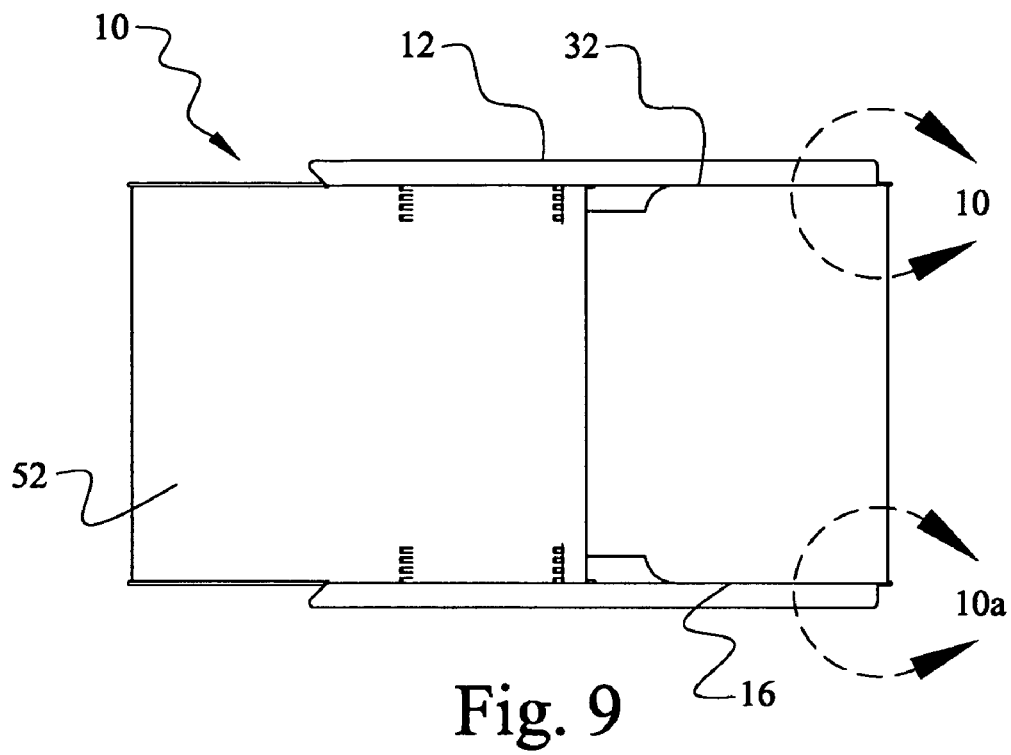
FIG. 9 is a top assembled view of the preferred embodiment.
Figure 10:
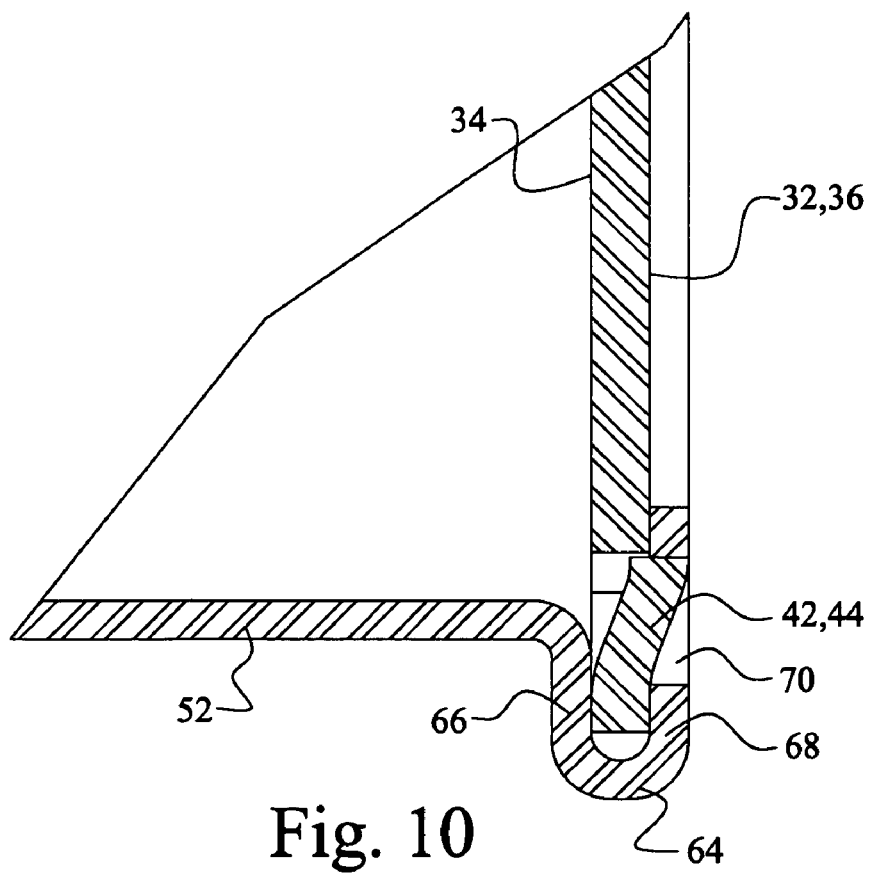
FIG. 10 is a cross sectional view of the preferred embodiment of the locked seam after forming taken along line 10 of FIG. 9.
Figure 10A:
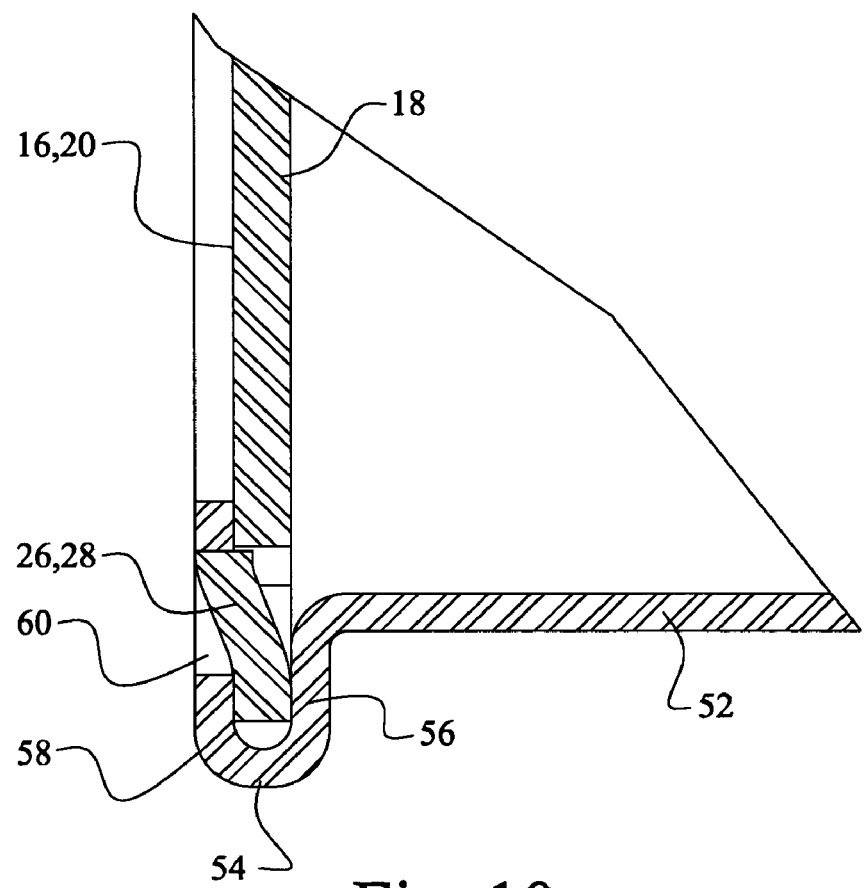
FIG. 10a is another cross sectional view of the preferred embodiment of the locked seam after forming taken along line 10a of FIG. 9.
Figure 11:
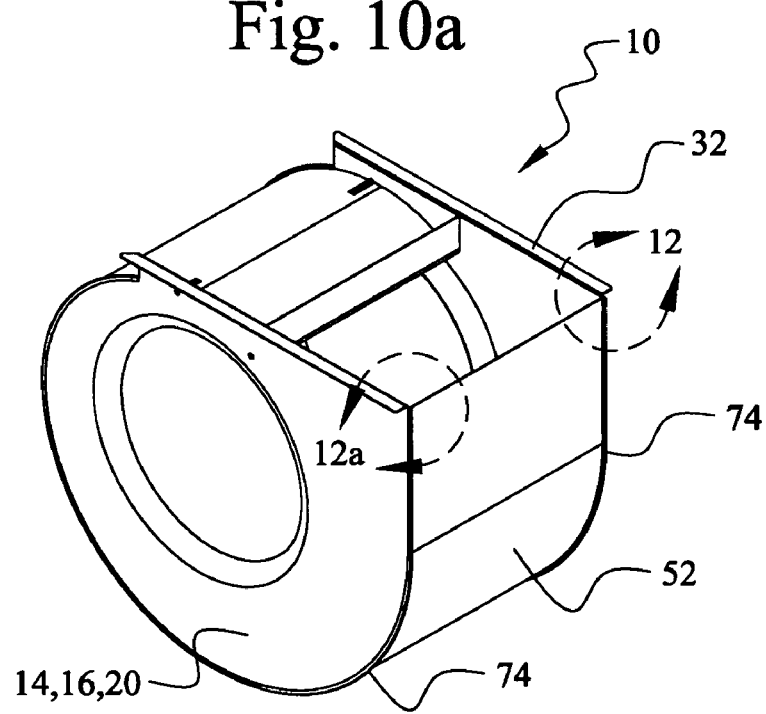
FIG. 11 is a perspective view of an alternate embodiment of the improved blower housing.
Figure 12:
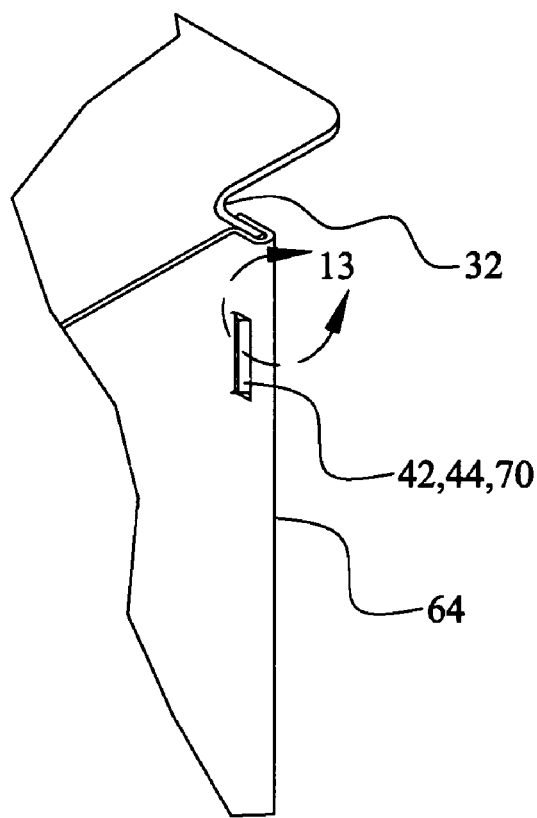
FIG. 12 is a detail perspective view of the alternate embodiment taken along line 12 of FIG. 11.
Figure 12A:
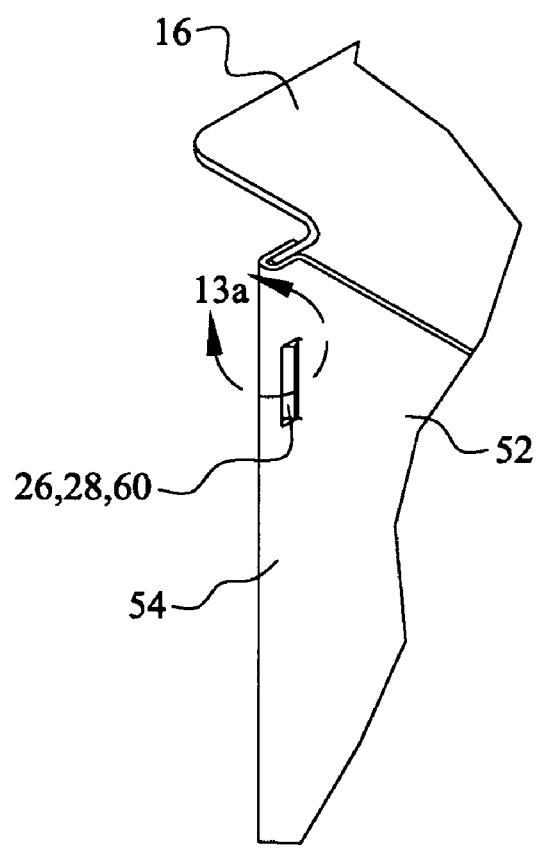
FIG. 12a is a detail perspective view of the alternate embodiment taken along line 12a of FIG. 11.
Figure 13:
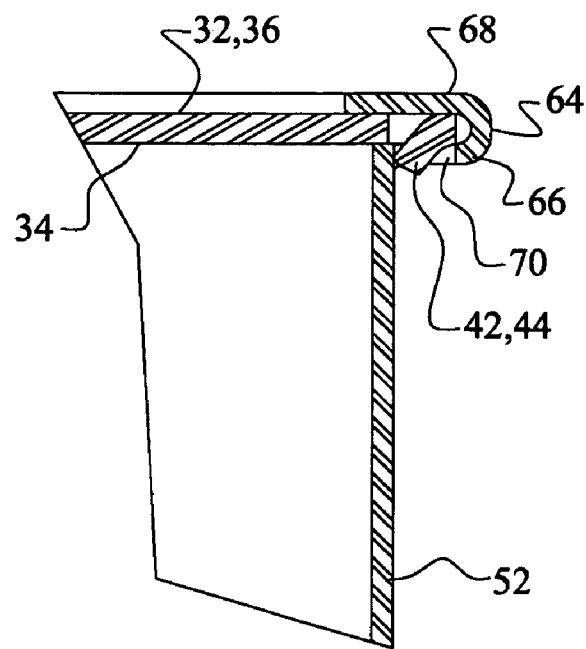
FIG. 13 is a cross sectional view of the alternate embodiment of the locked seam after forming and taken along line 13 of FIG. 12.
Figure 13A:
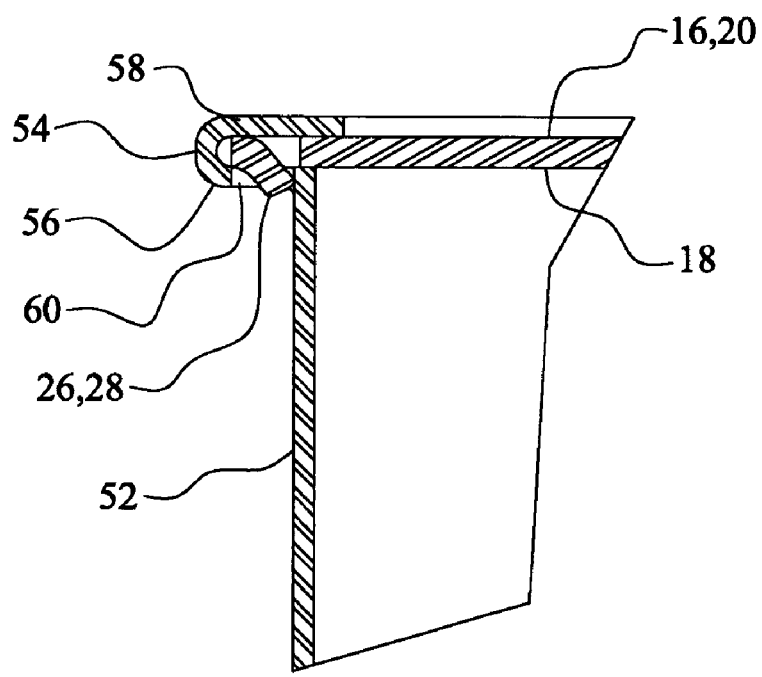

Referring now to the drawings, there is shown in FIGS. 1-10a a preferred embodiment and in FIGS. 11-13a alternate embodiments of the improved blower housing and method of manufacture 10. The improved blower housing 10, 12 comprises a first side wall 16, a second side wall 32 (collectively sidewalls 14) opposite the first side wall 16, and a wrapper wall sheet 52 attached intermediate the first side wall 16 and the second side wall 32.

In a preferred embodiment, the wrapper wall sheet 52 has a first lateral edge flange 54 and a second lateral end flange 64 opposite the first lateral edge flange 54. The first lateral edge flange 54 comprises a first inner portion 56 and a first outer portion 58 having one or more first apertures 60 and the opposite second lateral edge flange 64 comprises a second inner portion 66 and a second outer portion 68 having one or more second apertures 70. The first side wall 16 has a first inner surface 18, a first outer surface 20, and a first circumferential edge 22 with a first edge margin 24 having one or more first protrusions 26. The opposite second side wall 32 has a second inner surface 34, a second outer surface 36, and a second circumferential edge 38 with a second edge margin 40 having one or more second protrusions 42. The one or more first protrusions 26 protrude from the first outer surface 20 of the first side wall 16 and the one or more second protrusions 42 protrude from the second outer surface 36 of the second side wall 32. The one or more first apertures 60 of the wrapper wall sheet 52 are capable of receiving the one or more first protrusions 26 of the first side wall 16 and the one or more second apertures 70 of the wrapper wall sheet 52 are capable of receiving the one or more second protrusions 42 of the second side wall 32. This allows the first lateral edge flange 54 of the wrapper wall sheet 52 to attach with the first edge margin 24 of the first circumferential edge 22 of the first side wall 16 and the second lateral edge flange 64 of the wrapper wall sheet 52 to attach with the second edge margin 40 of the second circumferential edge 38 of the second side wall 32 by a formed joint or seam 74.

The formed joint or seam 74 comprises the combination of the one or more first protrusions 26 of the first edge margin 24 of the first side wall 16 received within the one or more first apertures 60 of the first lateral edge flange 54 of the wrapper wall sheet 52. The one or more second protrusions 42 of the second edge margin 40 of the second side wall 32 are received within the one or more second apertures 70 of the second lateral edge flange 64 of the wrapper wall sheet 52 also to form a joint or seam 74. Thus, when the first lateral edge flange 54 of the wrapper wall sheet 52 is formed or pressed against the first edge margin 24 of the first side wall 16 and the second lateral edge flange 64 of the wrapper wall sheet 52 is formed or pressed against the second edge margin 40 of the second side wall 32, the one or more first protrusions 26 are substantially locked within the one or more first apertures 60 and the one or more second protrusions 42 are substantially locked within the one or more second apertures 70.

In a preferred embodiment, the one or more first apertures 60 further comprise one or more first elongated apertures or slots and the one or more second apertures 70 further comprise one or more second elongated apertures or slots. In a preferred embodiment, the elongated apertures or slots 60, 70 are approximately ⅜ inches long and approximately ⅛ inches wide. In this embodiment, prior to attaching the wrapper wall sheet 52 to the first and second side walls 16, 32, both the first outer portion 58 of the first lateral edge flange 54 of the wrapper wall sheet 52 and the second outer portion 68 of the second lateral edge flange 64 of the wrapper wall sheet 52 are preferably formed at an approximate 30° angle to a vertical axis. In a preferred embodiment, both the first inner portion 56 of the first lateral edge flange 54 and the second inner portion 66 of the second lateral edge flange 64 are substantially vertical or at an approximate 0° angle relative to the vertical axis. Alternative embodiments may utilize any angle which allows the flanges 54, 64 to function as described herein. The size and quantity of the apertures 60, 70 and protrusions 26, 42 forming the locking tab 28, 44 and slot 60, 70 of the seam 74 is product driven and dictated by the size and type of blower housing 12.

Also in the preferred embodiment, the one or more first protrusions 26 further comprise one or more first tabs 28; and the one or more second protrusions 26 further comprise one or more second tabs 44. Both the one or more first tabs 28 and the one or more second tabs 44 are preferably formed by punching one or more substantially U-shaped members 30 along both the first and the second edge margins 24, 40 and bending (i.e. bent tab) the one or more substantially U-shaped members 30 outward such that one or more first protrusions 26 or first tabs 28 and the one or more second protrusions 42 or second tabs 44 are formed and protruding from the first outer surface 20 and the second outer surface 36, respectfully. In this embodiment, prior to attaching the wrapper wall sheet 52 to the first and second side walls 16, 32, both the one or more first tabs 28 and the one or more second tabs 44 are preferably formed such that they are protruding outward at an approximate 45° degree angle from a vertical axis. Alternative embodiments may utilize any angle which allows the tabs 28, 44 to function as described herein.

The one or more first tabs 28 and the one or more second tabs 44 are respectively formed and spaced along the first edge margin 24 and second edge margin 40 such that the one or more first tabs 28 are capable of being received within the one or more first slots 60 and the one or more second tabs 44 are capable of being received within the one or more second slots 70. In a preferred embodiment, when received, said tabs 28, 44 or protrusions 26, 42 forcibly engage or contact a wall of said slots or apertures 60, 70. That is, if preferred tolerances are maintained when assembled, a portion of the each protrusion 26, 42 contacts a portion of the aperture 60, 70 wall within which it is received or mated.

In an alternate embodiment of the improved blower housing 10, the first lateral edge flange 54 of the wrapper wall sheet 52 further comprises a first outer portion 58 and a first inner portion 56 having one or more first apertures 60, and the opposite second lateral edge flange 64 further comprises a second outer portion 68 and a second inner portion 66 having one or more second apertures 70. Also in the alternate embodiment, the one or more first protrusions 26 protrude from the first inner surface 18 of the first side wall 16 and the one or more second protrusions 42 protrude from the second inner surface 34 of the second side wall 32. That is, the location of the apertures 60, 70 are in the inner portion 56, 66 of the wrapper wall sheet 52 flanges 54, 64 and the location of the protrusions 26, 42 are on the inner surfaces 18, 34 of the side walls 14, as opposed to in the outer portion 58, 68 of the flanges 54, 64 and the outer surfaces 20, 36 of the side walls 16, 32 as in the preferred embodiment. This locates the combination locking tab 28, 44 and slot 60, 70 of the seam 74 on the first inner surface 18 of the first side wall 14 and the second inner surface 34 of the second side wall 32 of the improved blower housing 10, 12. Said tabs 28, 44 and slots 60, 70 are thereby less visible on the improved blower housing 10, 12 assembly versus the preferred embodiment where said tabs 28, 44 and slots 60, 70 are located on the outer surfaces 20, 36 of the side walls.

In other alternative embodiments, the first side wall edge 22 further comprises a first edge margin 24 having one or more first apertures 60; and a second side wall edge 38 further comprises a second edge margin 40 having one or more second apertures 70. The wrapper wall sheet 52 further comprises a first lateral edge flange 54 having one or more first protrusions 26; and a second lateral edge flange 64 having one or more second protrusions 42. Both the one or more first protrusions 26 and the one or more second protrusions 42 are capable of formation in either an inner portion 56, 66 or an outer portion 58, 68 of the lateral edge 54, 64 thereby effecting whether the combination locking tab 28, 44 and slot 60, 70 of the seam 74 is located on either an outer portion 58, 68 or outer surface 20, 36 or an inner portion 56, 66 or inner surface 18, 34 as in other embodiments of the improved blower housing 10, 12.

The improved blower housing 10 is manufactured by forming and providing a first side wall 16, a second side wall 32 opposite the first side wall 16, and a wrapper wall sheet 52 attached intermediate the first side wall 16 and the second side wall 32. The wrapper wall sheet 52 is preferably first formed by punching or forming the one or more first apertures 60 along the first lateral edge flange 54 and punching or forming the one or more second apertures 70 along the second lateral edge flange 64. Second, the first lateral edge flange 54 is bent into a substantially J-shaped first member and the second lateral edge flange 64 is bent into a substantially J-shaped second member such that the substantially J-shaped first member has the first inner portion 56 and the first outer portion 58 and the substantially J-shaped second member has the second inner portion 66 and the second outer portion 68. Both of the one or more first apertures 60 are punched on the first lateral edge flange 54 and the one or more second apertures 70 are punched on the second lateral edge flange 64 and positioned such that they are within the first outer portion 58 and the second outer portion 68, respectively. Alternative embodiments may utilize methods such as laser, water jet, or torch cutting to form said apertures 60, 70 in lieu of punching.

The first and second side walls 14, 32 are preferably formed by forming and punching one or more substantially U-shaped members 30 along both the first and the second edge margins 24, 40 and bending the one or more substantially U-shaped members 30 outward such that the one or more first protrusions 26 or first tabs 28 and the one or more second protrusions 42 or second tabs 44 are formed and protruding from the first outer surface 20 and the second outer surface 36, respectfully.

The wrapper wall sheet 52 is then positioned and held intermediate the first side wall 16 and the opposite second side wall 32 such that the one or more first protrusions 26 of the first edge margin 24 of the first side wall 16 are received within the one or more first apertures 60 of the first lateral edge flange 54 of the wrapper wall sheet 52 and the one or more second protrusions 42 of the second edge margin 40 of the second side wall 32 are received within the one or more second apertures 70 of the second lateral edge flange 64 of the wrapper wall sheet 52. The first lateral edge flange 54 of the wrapper wall sheet 52 is then formed or pressed against the first edge margin 24 of the first side wall 16 and the second lateral edge flange 64 of the wrapper wall sheet 52 is formed or pressed against the second edge margin 40 of the second side wall 32. Typically, right and left forming rollers adapted to engage with the flange 54, 64 rotationally press the outer portion 58, 68 onto and with said edge margin 24, 40. Other methods understood within the art may be utilized to perform the aforesaid pressing operation.

After forming both the first lateral edge flange 54 and the second lateral edge flange 64, the one or more first protrusions 26 are substantially locked within the one or more first apertures 60, and the one or more second protrusions 42 are substantially locked within the one or more second apertures 70 and essentially non-separable. The substantial lockup provides three-axial locking thereby providing greater stability and minimal slippage in a forming machine. That is, the wrapper wall sheet 52 is substantially locked to the first side wall 16 and the second side wall 32 after just starting to form the first and second lateral edges 54, 64 with only one first protrusion 26 received within one first aperture 60 and/or one second protrusion 42 received within one second aperture 70.

Within the aforesaid first alternate embodiments, the wrapper wall sheet 52 has both the one or more first apertures 60 punched on the first lateral edge flange 54, the one or more second apertures 70 punched on the second lateral edge flange 64, and each are positioned such that they are within the first inner portion 56 and the second inner portion 66, respectively. The first and second side walls 16, 32 are preferably formed by punching one or more substantially U-shaped members 30 along both the first and the second edge margins 24, 40, bending the one or more substantially U-shaped members 30 inward such that one or more first protrusions 26 or first tabs 28 and the one or more second protrusions 42 or second tabs 44 are formed and protruding from the first inner surface 18 and the second inner surface 34 respectfully. Further alternate embodiments may utilize protrusions 26, 42 which are simply drawn from or which are attached with the edge margins 24, 40. Assembly proceeds as with the preferred embodiment.

Within another alternate embodiment, the wrapper wall sheet 52 is alternatively formed by forming or punching one or more substantially U-shaped members 30 along both the first and the second lateral edge flanges 54, 64 and bending both the one or more substantially U-shaped members 30 outward such that one or more first protrusions 26 or tabs 28 and the one or more second protrusions 42 or tabs 44 are formed and protruding from the first outer portion 58 and the second outer portion 68 respectfully. The first and second side walls 16, 32 are preferably formed by forming or punching one or more first apertures 60 along the first edge margin 24 and punching one or more second apertures 70 along the second edge margin 40. The wrapper wall sheet 52 is positioned and held intermediate the first side wall 16 and the opposite second side 32 wall such that the one or more first protrusions 26 of the first lateral edge 54 are received within the one or more first apertures 60 of the first edge margin 24 of the first side wall 16 and the one or more second protrusions 42 of the second lateral edge 64 are received within the one or more second apertures 70 of the second edge margin 40 of the second side wall 32. The first lateral edge 54 of the wrapper wall sheet 52 is formed or pressed against the first edge margin 24 of the first side wall 16 and the second lateral edge 64 of the wrapper wall sheet 52 is formed or pressed against the second edge margin 40 of the second side wall 32. Again, typically right and left forming rollers adapted to engage with the flange 54, 64 rotationally press the outer portion 58, 68 onto and with said edge margin 24, 40. After forming both the first lateral edge 54 and the second lateral edge 64, the one or more first protrusions 26 are substantially locked within the one or more first apertures 60, and the one or more second protrusions 42 are substantially locked within the one or more second apertures 70 and are essentially non-separable.

Further alternate embodiments encompass the one or more substantially U-shaped members 30 along both the first and the second lateral edge flanges 54, 64. The members 30 are bent inward such that the one or more first tabs 28 and the one or more second tabs 44 are formed and protruding from the first inner portion 56 and the second inner portion 66, respectfully. Again, assembly proceeds as with the preferred embodiment.

From the foregoing description, those skilled in the art will appreciate that an improved blower housing and method of manufacture 10 has been shown and described. The art is easy and cost effective to manufacture and repair, and further provides positive blower housing 12 component 14, 52 locking without slippage and without the use of spot welds or other types of fasteners.

Having described the invention in detail, those skilled in the art will appreciate that all the objects of the present invention are realized and that modifications may be made to the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A blower housing comprising:
    a first side wall having a first inner surface, a first outer surface, a first circumferential edge with a first edge margin, and one or more first protrusions protruding from said first edge margin;
    a second side wall having a second inner surface, a second outer surface, a second circumferential edge with a second edge margin, and one or more second protrusions protruding from said second edge margin;
    a wrapper wall sheet having a first lateral edge flange and a second lateral edge flange, said first lateral edge flange having a first inner portion, a first outer portion, and one or more first apertures and said second lateral edge flange having a second inner portion, a second outer portion, and one or more second apertures; and
    the combination of one or more of said first protrusions received and locked within one or more of said first apertures and one or more of said second protrusions received and locked within one or more of said second apertures whereby said first lateral edge flange of said wrapper wall sheet is attached to said first edge margin of said first circumferential edge of said first side wall and said second lateral edge flange of said wrapper wall sheet is attached to said second edge margin of said second circumferential edge of said second side wall, thereby each forming a seam and collectively forming a blower housing.

2. The blower housing of claim 1, said protrusions further comprising:

one or more bent tabs.

3. The blower housing of claim 2, said tabs further comprising:
one or more U-shaped members formed within said edge margins.

4. The blower housing of claim 1 whereby:
one or more of said protrusions protrude from said outer surfaces; and
one or more of said apertures are in said outer portions.

5. The blower housing of claim 1 whereby:
one or more of said protrusions protrude from said inner surfaces; and
one or more of said apertures are in said inner portions.

6. The blower housing of claim 2 whereby:
one or more of said bent tabs protrude from said outer surfaces; and
one or more of said apertures are in said outer portions.

7. The blower housing of claim 2 whereby:
one or more of said protrusions protrude from said inner surfaces; and
one or more of said apertures are in said inner portions.

8. A method of manufacturing a blower housing, the steps comprising:
providing a first side wall;
forming one or more first protrusions within a first edge margin of said first side wall;
providing a second side wall;
forming one or more second protrusions within a second edge margin of said second side wall;
providing a wrapper wall sheet;
forming one or more first apertures along a first lateral edge flange;
forming one or more second apertures along a second lateral edge flange;
bending said flanges into substantially J-shaped members, said first lateral edge flange thereby having a first inner portion and a first outer portion and said second lateral edge flange thereby having a second inner portion and a second outer portion;
positioning said wrapper wall sheet intermediate said first side wall and said second side wall;
receiving one or more of said first protrusions of said first edge margin within one or more of said first apertures of said first lateral edge flange and one or more of said second protrusions of said second edge margin within said one or more second apertures of said second lateral edge flange;
pressing said first lateral edge flange against said first edge margin; and
pressing second lateral edge flange against said second edge margin whereby one or more of said protrusions are locked within one or more of said apertures, thereby forming a blower housing.

9. The method of manufacturing a blower housing as set forth in claim 8, the steps of forming one or more of said protrusions further comprising:
forming one or more members along said edge margins; and
bending said members from said edge margins.

10. The method of manufacturing a blower housing as set forth in claim 9, whereby:
one or more of said members are formed in a substantially U-shape.

* * * * *